United States Patent
Gurumoorthy et al.

(10) Patent No.: US 11,388,628 B2
(45) Date of Patent: Jul. 12, 2022

(54) IN ORDER PACKET DELIVERY FOR COMPRESSED RADIO BEARERS

(71) Applicant: Apple Inc., Cupertino, CA (US)

(72) Inventors: Sethuraman Gurumoorthy, San Jose, CA (US); Murtaza A. Shikari, Mountain View, CA (US); Srirang A. Lovlekar, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 21 days.

(21) Appl. No.: 16/519,051

(22) Filed: Jul. 23, 2019

(65) Prior Publication Data

US 2020/0037204 A1 Jan. 30, 2020

Related U.S. Application Data

(60) Provisional application No. 62/703,600, filed on Jul. 26, 2018.

(51) Int. Cl.
*H04W 28/06* (2009.01)
*H04L 1/16* (2006.01)
*H04W 80/08* (2009.01)

(52) U.S. Cl.
CPC ........... *H04W 28/06* (2013.01); *H04L 1/1642* (2013.01); *H04W 80/08* (2013.01)

(58) Field of Classification Search
USPC ....................................................... 370/329
See application file for complete search history.

(56) References Cited

U.S. PATENT DOCUMENTS

| | | | |
|---|---|---|---|
| 9,125,109 B1 | 9/2015 | Vivanco | |
| 9,385,931 B1 | 7/2016 | Vivanco et al. | |
| 9,788,227 B2 | 10/2017 | Pragada | |
| 9,918,252 B2 | 3/2018 | Cheng | |
| 9,954,789 B2 | 4/2018 | Basu Mallick | |
| 10,212,728 B2 | 2/2019 | Lee | |
| 2007/0047547 A1* | 3/2007 | Conner | H04L 69/04 370/392 |

(Continued)

FOREIGN PATENT DOCUMENTS

| | | |
|---|---|---|
| CN | 107404396 A | 11/2017 |
| CN | 107566330 A | 1/2018 |

(Continued)

OTHER PUBLICATIONS

First Office Action for CN Patent Application No. 201910679382.8, dated Jun. 21, 2021.

*Primary Examiner* — Gregory B Sefcheck
*Assistant Examiner* — Majid Esmaeilian
(74) *Attorney, Agent, or Firm* — Kowert, Hood, Munyon, Rankin & Goetzel, P.C.

(57) ABSTRACT

This disclosure relates to providing in order packet delivery for compressed radio bearers. A wireless device may receive packet data at a packet data convergence protocol layer. A packet reordering timer length to use for the packet data at the packet data convergence protocol layer may be adaptively selected from multiple possible packet reordering timer lengths. The packet data may be processed at the packet data convergence protocol layer using the selected packet reordering timer length. The packet reordering timer length may be selected based at least in part on a robust header compression decompressor state of the packet data convergence protocol layer.

20 Claims, 8 Drawing Sheets

(56) References Cited

U.S. PATENT DOCUMENTS

| | | | |
|---|---|---|---|
| 2012/0047407 A1* | 2/2012 | Tilwani | H04L 1/1848 |
| | | | 714/55 |
| 2012/0155438 A1 | 6/2012 | Shin | |
| 2016/0277957 A1 | 9/2016 | Patel | |
| 2017/0201603 A1 | 7/2017 | Uchino | |
| 2018/0007113 A1* | 1/2018 | Parron | H04L 65/608 |
| 2018/0324651 A1 | 11/2018 | Tenny | |
| 2019/0028920 A1 | 1/2019 | Pan | |
| 2019/0045577 A1 | 2/2019 | Kim | |
| 2019/0045581 A1 | 2/2019 | Martinez Tarradell | |
| 2019/0053099 A1* | 2/2019 | Kim | H04W 76/10 |
| 2019/0124575 A1* | 4/2019 | Long | H04W 36/14 |
| 2020/0037204 A1* | 1/2020 | Gurumoorthy | H04W 80/08 |

FOREIGN PATENT DOCUMENTS

| | | |
|---|---|---|
| CN | 107852768 A | 3/2018 |
| WO | 2017201715 A1 | 11/2017 |

* cited by examiner

IN ORDER PACKET DELIVERY FOR COMPRESSED RADIO BEARERS

PRIORITY INFORMATION

This application claims priority to U.S. provisional patent application Ser. No. 62/703,600, entitled "In Order Packet Delivery for Compressed Radio Bearers," filed Jul. 26, 2018, which is hereby incorporated by reference in its entirety as though fully and completely set forth herein.

FIELD

The present application relates to wireless communications, and more particularly to systems, apparatuses, and methods for in order packet delivery for compressed radio bearers.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments are presented herein of apparatuses, systems, and methods for providing in order packet delivery for compressed radio bearers.

According to the techniques described herein, a packet reordering timer may be used at the packet data convergence protocol (PDCP) layer of a wireless device to allow a certain amount of time for receiving and reordering packets that are received at the PDCP layer out-of-order, while also limiting the maximum allowed delay before proceeding to process the next available packet.

The length of the packet reordering timer may be adaptively selected based at least in part on the current circumstances of the wireless device. In particular, the robust header compression (RoHC) decompressor state of the wireless device at the PDCP layer may be considered and may impact the packet reordering timer length selection. For example, for higher order states (e.g., in which more context is available and greater header compression is possible), it may be beneficial to use a longer packet reordering timer length than for lower order states (e.g., in which less context is available and partial or no header compression is being used).

Such an approach may potentially increase the likelihood that out-of-order packets can be received in time to maintain RoHC context, and thus a higher order state, when already in a higher order state, while also potentially limiting the processing delay when RoHC context information is not yet available, at least according to some embodiments.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
E-UTRAN: Enhanced UMTS Terrestrial Radio Access Network
5G-NR: Fifth Generation New Radio
EN-DC: E-UTRAN NR Dual Connectivity
TX: Transmission/Transmit
RX: Reception/Receive
RAT: Radio Access Technology Terms The Following is a Glossary of Terms that may Appear in the Present Disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 1:
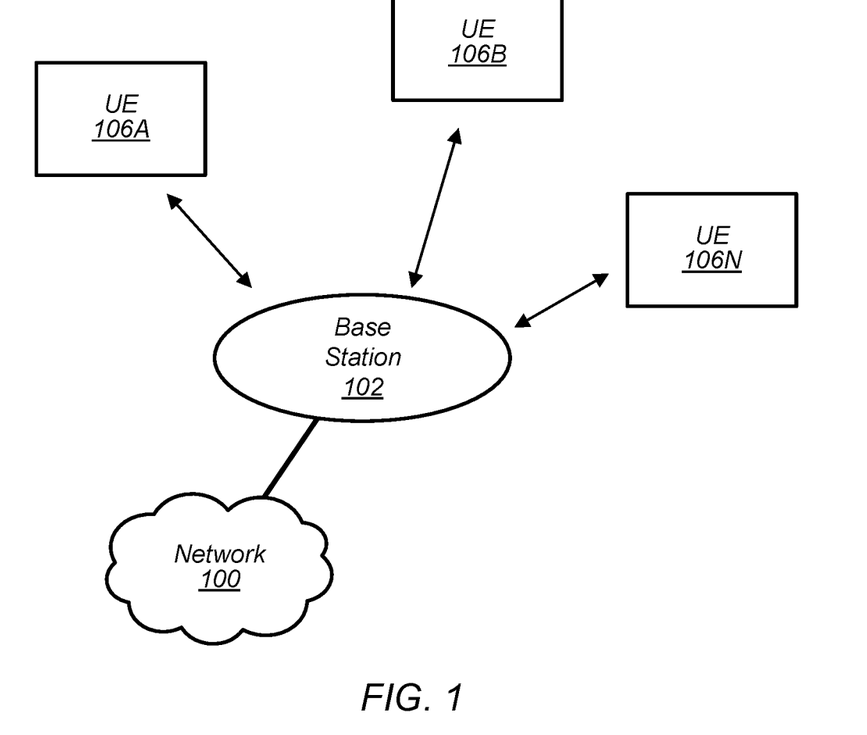
FIG. 1 illustrates an exemplary (and simplified) wireless communication system, according to some embodiments.
Figure 2:
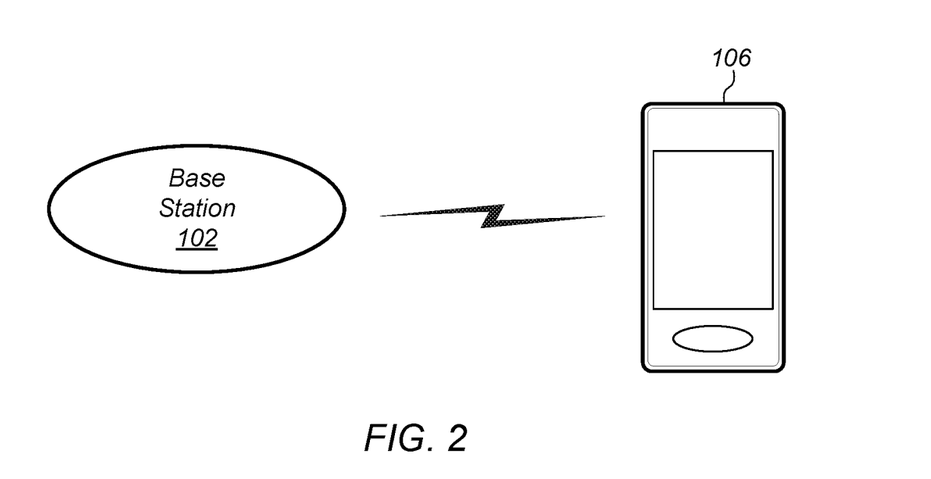
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), LAA/LTE-U, 5G NR, 3GPP2 CDMA2000 (e.g., 1xRTT, 1xEV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform cellular communication using techniques for early packet delivery to radio link control, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include one or more programmable hardware elements such as an FPGA (field-programmable gate array), an integrated circuit, and/or any of various other possible hardware components that are configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1xRTT (or LTE or NR, or LTE or GSM), and separate radios for communicating using each of Wi-Fi and BLUETOOTH™. Other configurations are also possible.

Figure 3:
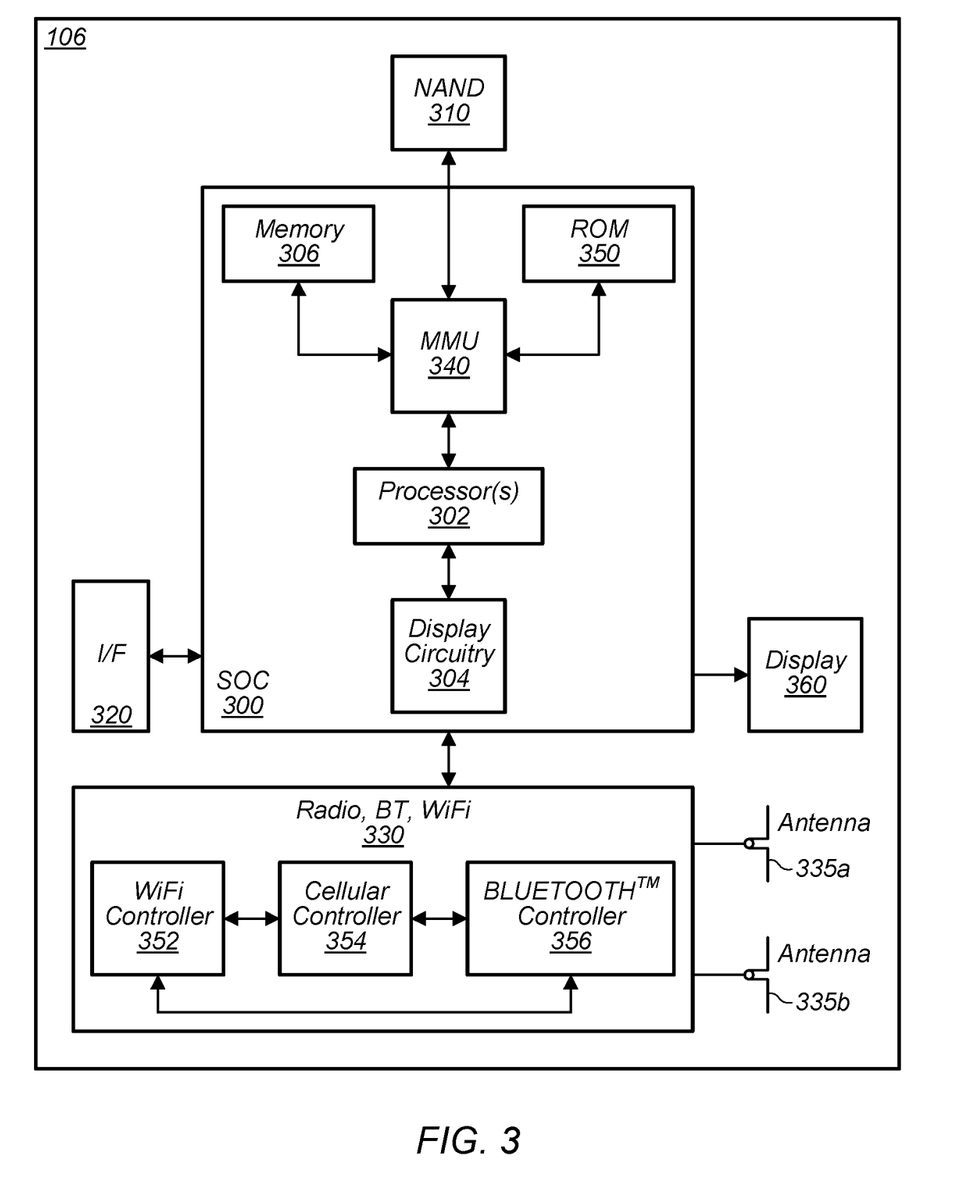
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system; dock; charging station; input devices, such as a microphone, camera, keyboard; output devices, such as speakers; etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to provide in order packet delivery for compressed radio bearers, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to provide in order packet delivery for compressed radio bearers according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g., NR, LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
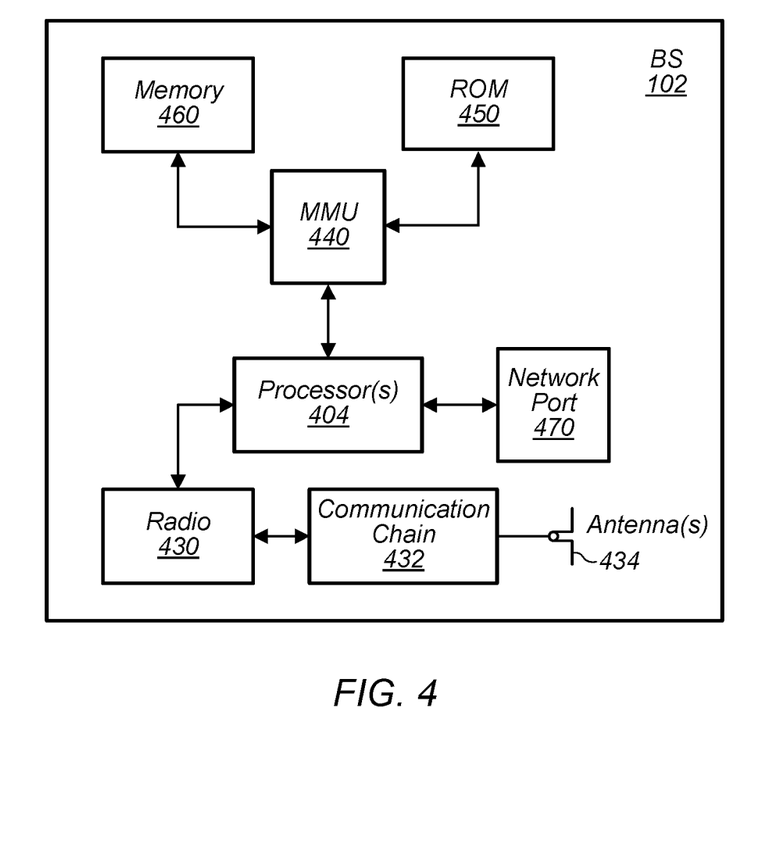
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. The base station 102 may operate according to the various methods as disclosed herein for providing and/or supporting provision of in order packet delivery for compressed radio bearers.

Figure 5:
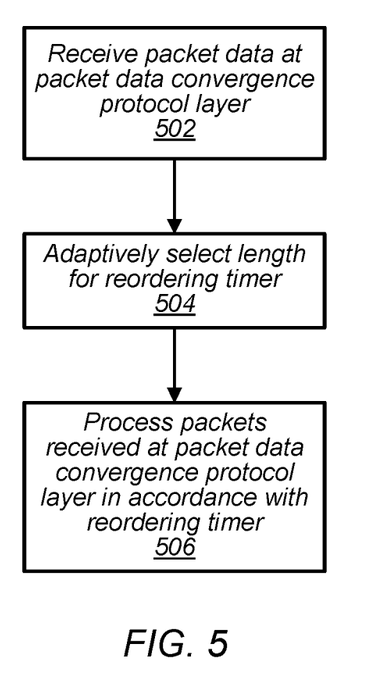
FIG. 5 is a flowchart diagram illustrating aspects of an exemplary possible method for providing in order packet delivery for compressed radio bearers, according to some embodiments.

FIG. 5—In Order Packet Delivery for Compressed Radio Bearers

FIG. 5 is a flowchart diagram illustrating a method for a wireless device to provide in order packet delivery for compressed radio bearers when performing cellular communication, according to some embodiments.

Aspects of the method of FIG. 5 may be implemented by a wireless device, such as a UE 106 or a BS 102 illustrated in and described with respect to various of the Figures herein, or more generally in conjunction with any of the computer systems or devices shown in the above Figures, among other devices, as desired. Note that while at least some elements of the method of FIG. 5 are described in a manner relating to the use of communication techniques and/or features associated with LTE, LTE-A, NR, and/or 3GPP specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In 502, a wireless device may receive packet data at a packet data convergence protocol (PDCP) layer of the wireless device. According to some embodiments, the packet data may be received wirelessly from a cellular base station by a wireless device served by the cellular base station (e.g., a downlink communication). As another possibility, the wireless device may be a cellular base station, and the packet data may be wirelessly received from a device served by the cellular base station (e.g., an uplink communication). The wireless communication may comply with 3GPP 5G NR specifications, in some embodiments. Alternatively, any of various other wireless communication technologies (e.g., LTE, LTE-A, etc.) may be used to perform the wireless communication, as desired. For example, the packet data may include packet data received via NR as part of a 5G NR standalone cellular link, or may include packet data received via both NR and LTE as part of a EN-DC cellular link, among other possibilities.

The packet data may be processed in any of various ways prior to being provided to the PDCP layer. According to some embodiments, physical (PHY) layer processing to demodulate, perform rate matching, and channel decoding may be used to obtain a media access control (MAC) layer transport block. Packet data may be provided from the MAC layer to the radio link control (RLC) layer in increments of complete RLC protocol data units (PDUs), and from the RLC layer to the packet data convergence protocol (PDCP) layer in increments of complete PDCP PDUs. At least according to some embodiments (e.g., at a NR RLC layer), the RLC layer may provide PDCP PDUs to the PDCP layer out of order (e.g., may not perform packet reordering) according to packet sequence numbers for the packet data.

The PDCP layer may perform any of a variety of functions. As one such possible function, header compression and decompression may be performed by the PDCP layer, e.g., using robust header compression (RoHC) techniques. For example, the packet data may be received in conjunction with a compressed radio bearer, e.g., for which higher (e.g., transport/network) layer header compression is used by the transmitter of the packet data.

The RoHC techniques may be capable of utilizing multiple operating states. For example, when context has not been sufficiently established for a given bearer, RoHC may operate in an initial/refresh state, e.g., in which the transmitter does not compress the higher layer headers for the bearer, so that the receiver can establish context for the bearer. Once context has been established, RoHC may operate in a first order state (e.g., if static context is available at the receiver, the transmitter may compress the higher layer headers to include only dynamic/changed fields of the higher layer headers), or may operate in a second order state (e.g., if full context is available at the receiver, the transmitter may compress the higher layer headers to include only delta information relative to the previous packet).

Thus, when the RoHC operation is in the second order state, packet header compression, and potentially link use efficiency, may be substantially higher than when in the initial/refresh state or even the first order state. Accordingly, the RoHC operation of the wireless device remaining in the second order state for a greater proportion of time may generally be desirable, at least according to some embodiments.

Since performing RoHC decompression when in the second order state may rely on delta information between packets to effectively decompress the higher layer headers, in-order RoHC packet processing may be important to avoid fallback to initialization/reset or first order RoHC operation. Thus, if there is missing packet data at the PDCP layer, it may be desirable to wait for the eventual arrival of the missing packet data so that packet data can be provided to the RoHC decompressor in-order. However, it may also be desirable to not wait indefinitely for missing packet data, e.g., to avoid excessively delaying provision of queued packet to higher layers.

Given such considerations, the wireless device may utilize a packet reordering timer to limit the amount of time that the wireless device will wait for a missing packet before feeding the next packet into the RoHC decompressor. In 504, the length of the packet reordering timer may be adaptively selected by the wireless device. For example, given the relatively high sensitivity to whether packets are processed in-order or out-of-order when operating in the RoHC second order state, and the relatively high cost of unsuccessful RoHC decompression (e.g., potential fallback to the first order state or the initialization/refresh state and a corresponding reduction to link efficiency), it may be desirable to select a longer length for the packet reordering timer length when the RoHC decompressor is in the second order state than when the RoHC decompressor state is in the first order state or the initialization/refresh state. Similarly, a longer length for the packet reordering timer length may be selected when the RoHC decompressor is in the first order state than when the RoHC decompressor state is in the initialization/refresh state, according to some embodiments.

In 506, the wireless device may process the packet data received at the PDCP layer in accordance with the selected reordering timer length. Thus, for example, the wireless device may perform RoHC decompression of the packet data in-order according to sequence numbers for the packet data when there is no missing packet data, and may wait for up to the length of the packet reordering timer for missing packet data when there is missing packet data. The wireless device may perform RoHC decompression with missing packet data skipped when there is missing packet data according to the sequence numbers for the packet data and the packet reordering timer has expired.

Note that such adaptive packet reordering timer length selection may be performed on a per-radio-bearer basis, if desired. For example, the RoHC state for one data radio bearer in active use by the wireless device may be different than the RoHC state for another data radio bearer in active use by the wireless device, such that when the PDCP layer receives packet data associated with the different data radio bearers, different packet reordering timer lengths may be used for the packet data associated with the different data radio bearers, e.g., based on the RoHC state being different for the different data radio bearers.

Such adaptive packet reordering timer length selection at a receiving device may be implemented by the receiving device without consultation or configuration by the transmitting device, if desired. Alternatively, a mechanism may be provided for negotiating or otherwise providing configuration information associated with adaptive scaling of the packet reordering timer length, e.g., from a cellular network to a device served by the cellular network. For example, a mechanism may be provided for a cellular network to control whether adaptive packet reordering timer length selection is enabled and/or what reordering timer values are used. For example, a cellular base station serving the wireless device may provide control signaling to indicate a reordering timer value to use in each of various possible robust header compression states the wireless device is operating with respect to the data radio bearer with which the packet data is associated, and/or otherwise to indicate parameters related to adaptive selection of a reordering timer length at the PDCP layer. Such control signaling may be included in broadcast system information for a cell, or may be provided on a device-by-device basis (e.g., with the potential for a wireless device to be configured differently at different times and/or for different radio bearers), for example using radio resource control signaling, among various possibilities.

Thus, such adaptive packet reordering timer length selection may help reduce potentially unnecessary context resets and/or negative acknowledgement feedback generation as a result of packet reordering timer expiry while in the first or second order RoHC state, e.g., by providing a greater amount of time to acquire and order packets at the PDCP layer before feeding those packets into the RoHC decompressor and passing them to higher layers while in those states. This may in turn increase the overall proportion of time in which the wireless device is able to remain in the second order RoHC state, which may have the beneficial impact of increasing overall link efficiency, at least according to some embodiments.

FIGS. 6-9—Additional Information

FIGS. 6-9 and the following information are provided as being illustrative of further considerations and possible implementation details relating to the method of FIG. 5, and are not intended to be limiting to the disclosure as a whole. Numerous variations and alternatives to the details provided herein below are possible and should be considered within the scope of the disclosure.

Many communication systems may utilize a hierarchical protocol stack, including various protocol layers at which various functions are performed. For example, many cellular communication systems may include at least packet data convergence protocol, radio link control, media access control, and physical layers. Additionally, one or more (e.g., higher) networking layers (e.g., TCP/IP, among various possibilities) may also be used in conjunction with a cellular protocol stack, in many instances.

Figure 6:
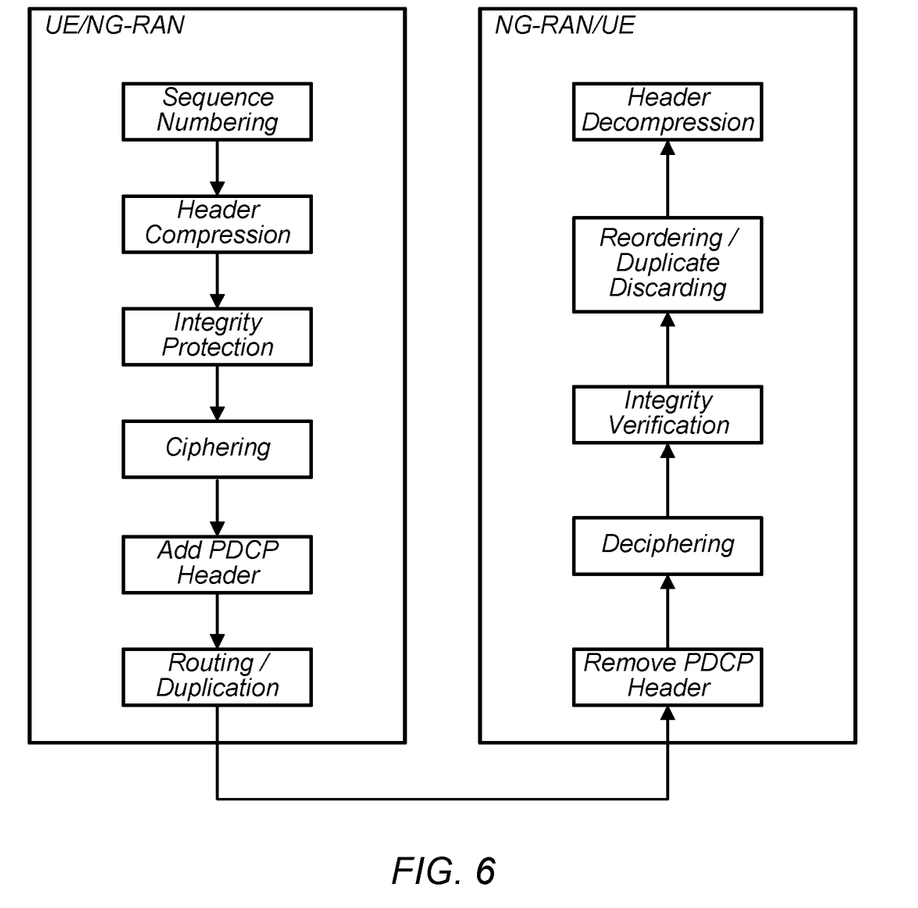
FIG. 6 illustrates exemplary possible aspects of packet data convergence protocol uplink and downlink processing, according to some embodiments.

FIG. 6 illustrates exemplary possible aspects of packet data convergence protocol uplink and downlink processing when using 5G NR cellular communication, according to some embodiments. As shown, at the transmitting device (e.g., a UE or NG-RAN), the PDCP layer may receive packets from higher layers (e.g., transport and network layers), and perform sequence numbering, header compression (e.g., using RoHC techniques), integrity protection, ciphering, and add PDCP headers. The PDCP layer may also perform routing and/or duplication, e.g., in case of a configuration in which multiple air interfaces are available, such as in a EN-DC configuration with LTE and NR air interfaces available, according to some embodiments, and may provide the resulting processed PDCP PDUs to lower layers for further processing and over-the-air transmission. At the receiving device (e.g., the NG-RAN or UE), the PDCP layer may receive PDCP PDUs from lower layers, may remove the PDCP headers, perform deciphering, integrity verification, reordering (and duplicate discarding, e.g., as needed), and header decompression (e.g., using RoHC techniques).

Figure 7:
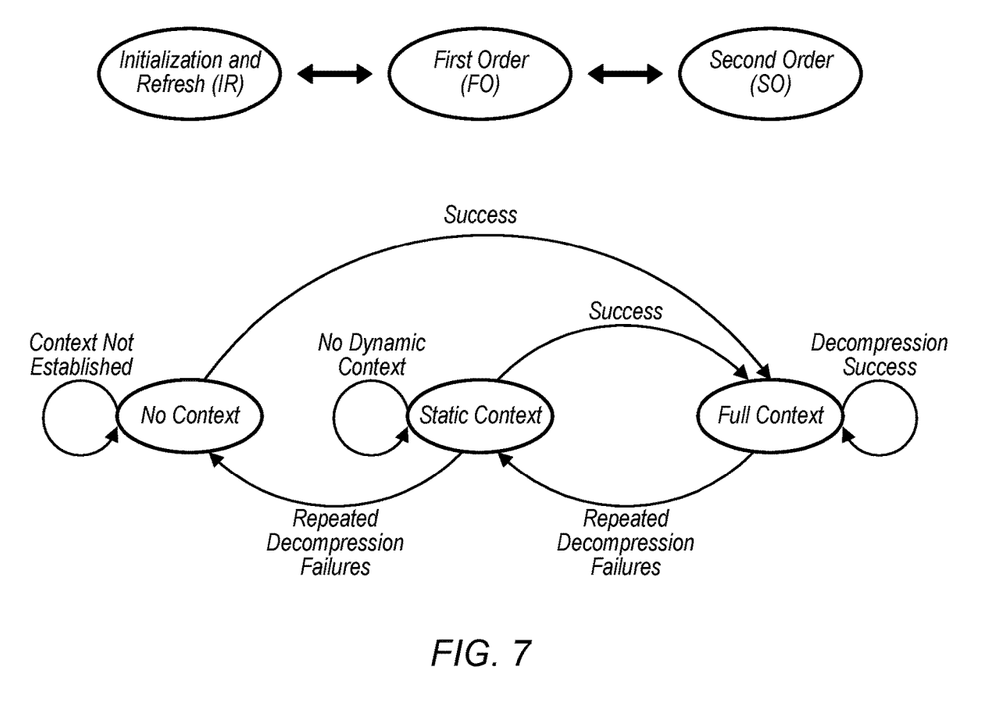
FIG. 7 illustrates exemplary possible aspects of robust header compression techniques, according to some embodiments.

FIG. 7 illustrates exemplary possible aspects of RoHC techniques, according to some embodiments. As shown, the RoHC processing may utilize a state machine. A transmitter may perform header compression in which no header compression is performed in an initialization and refresh state, e.g., when the receiver context is not yet established or has been reset, so that the receiver can establish context, as one possible state. If static context but not dynamic context is available at the receiver, the RoHC processing may operate in a first order state, in which the transmitter may perform header compression with static fields suppressed but dynamic fields retained, as another possible state. If full dynamic context is available at the receiver, the RoHC processing may operate in a second order state, in which the transmitter may perform header compression with static fields suppressed and dynamic fields communicated using delta information relative to the previous packet in the sequence, as another possible state. Transitions to higher states (e.g., from IR to FO or SO, or from FO to SO) may occur upon a sufficient number of successfully header decompression operations in the current state to obtain context information for the transitioned-to state, while transitions to lower states (e.g., from SO to FO or IR, or from FO to IR) may occur upon a certain number of unsuccessful header decompression operations in the current state (e.g., demonstrating that insufficient context is available for the current state), at least according to some embodiments.

5G NR has introduced out of order delivery for RLC PDUs to PDCP. Thus, the receiving RLC entity of a device may be able to deliver PDCP SDUs out of order to its PDCP entity. Such potentially out of order RLC PDUs could thus result in PDCP SDUs being fed into the RoHC decompressor with potential gaps in IP sequence numbering. PDCP reordering can help mitigate this issue to an extent, but upon expiry of the reordering timer ("T_reordering"), sequence number (SN) gaps would still be exposed to the RoHC decompressor. Such gaps in sequence numbering flow can result in frequent/abrupt changes to the master sequence number (MSN), leading to frequent context downgrades (e.g., first order (FO) to initialization/reset (IR) or second order (SO) to FO, etc.). This can also lead to potential negative acknowledgement (NACK) feedback generation at the decompressor. It may be desirable to prevent or at least reduce such unwanted context resets and NACK feedback generation, and more generally to increase the amount of time that the RoHC state machine stays in the efficient second order state.

Figure 8:
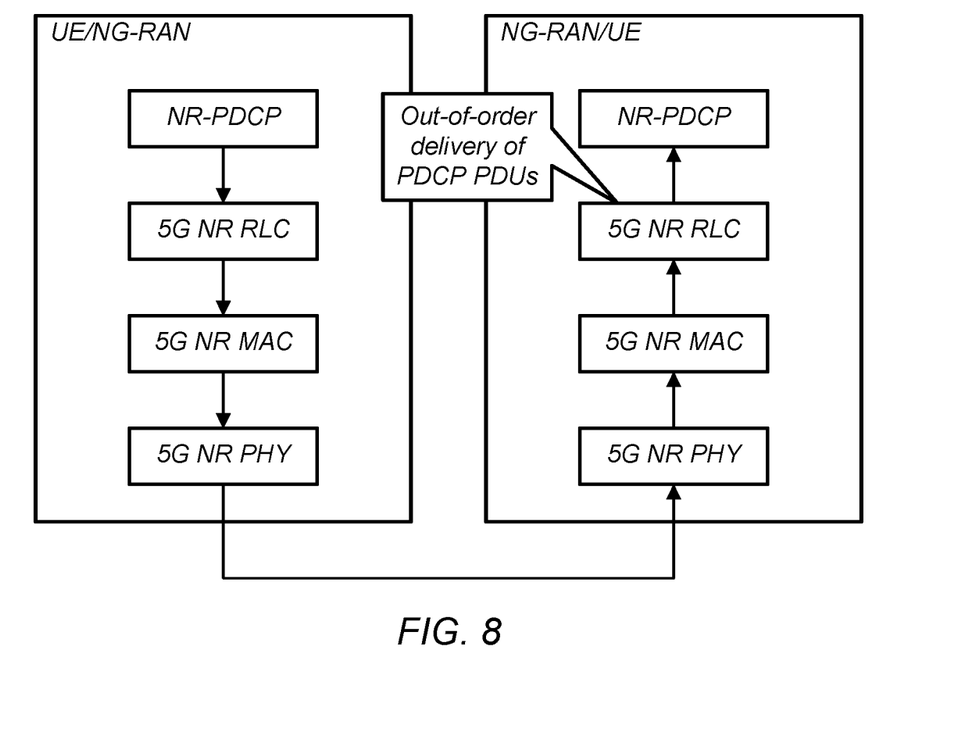
FIGS. 8-9 illustrate exemplary possible aspects of packet data convergence protocol service data unit delivery in 5G-NR standalone and EN-DC configurations, respectively, according to some embodiments.
Figure 9:
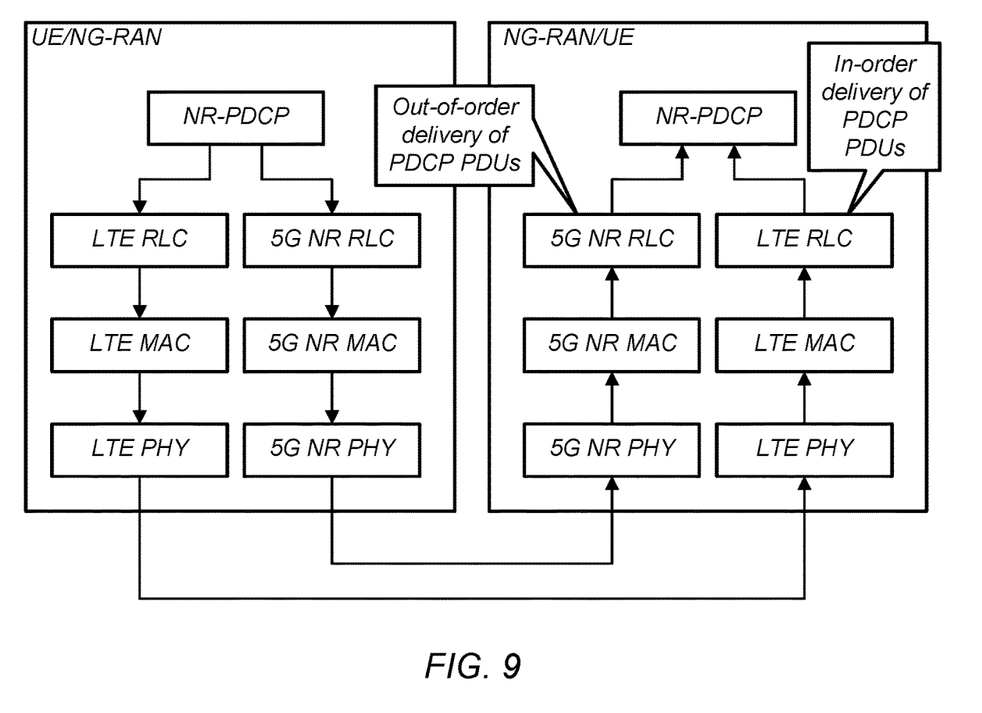

FIGS. 8-9 illustrate exemplary possible aspects of packet data convergence protocol service data unit delivery in 5G-NR standalone and EN-DC configurations, respectively, according to some embodiments. As shown in FIG. 8, with the 5G NR RLC layer providing out-of-order delivery (OOD) to the PDCP, a PDCP reordering function at the receiving entity may be tasked to reorder the incoming PDCP packets (RLC SDUs), controlled by the T_reordering timer. On T_reordering timer expiry, the received packets are decompressed and indicated to higher transport/network layers (e.g., TCP/UDP/IP). This decompression may be performed on a set of packets that can potentially have a MSN gap, e.g., if one or more packets are missing upon T_reordering timer expiry.

In the case of EN-DC configuration, the NR-PDCP may suffer from the asymmetric nature of the underlying cellular radio links (e.g., LTE and 5G NR). Thus, OOD may also occur in such a case, potentially including packets received with in-order delivery from the LTE RLC, as shown, in addition to out-of-order delivery from the NR RLC.

Thus, since the T_reordering timer is used in 5G-NR PDCP to determine when to trigger higher layer delivery of PDCP SDUs in case of gaps in the received PDCP SDU sequence, to better manage the reordering of packets at the PDCP layer, it may be beneficial to adaptively scale the T_reordering timer for compressed bearers based on feedback from the RoHC state machine, e.g., based on the current decompressor state (for the given PDCP instance). For example, a shorter length may be used when in the IR state than in the FO state, and a shorter length may be used when in the FO state than in the SO state, e.g., such that multiple T_reordering timer lengths may be possible, in accordance with the following inequality:

$$T\_reordering\_IR \leq T\_reordering\_FO \leq T\_reordering\_SO$$

where T_reordering_IR is the T_reordering timer length in the initial/refresh state, where T_reordering_FO is the T_reordering timer length in the first order state, and where T_reordering_SO is the T_reordering timer length in the second order state.

This may provide a longer window to allow packets to be re-ordered prior to the RoHC decompression in the SO state. As a result, perceived decompression context loss due to out of order delivery can be avoided more frequently, and the compressor and decompressor may thus be able to stay in the more efficient SO state during a greater proportion of time.

Note that such a mechanism can be implemented as a device specific internal optimization (e.g., without affecting or being affected by the other party to the cellular communication), if desired. Alternatively, such a mechanism may be negotiated, enabled, controlled, or otherwise configured in coordination with the other party to the cellular communication, if desired. For example, cellular network configuration parameters provided to a wireless device served by a cellular network could include one or more parameters associated with adaptive PDCP reordering timer scaling, according to some embodiments.

In the following further exemplary embodiments are provided.

One set of embodiments may include a method, comprising: by a device: receiving packet data at a packet data convergence protocol (PDCP) layer; adaptively selecting a packet reordering timer length to use for the packet data at the PDCP layer, wherein the packet reordering timer length is selected from multiple possible packet reordering timer lengths; and processing the packet data at the PDCP layer using the selected packet reordering timer length.

According to some embodiments, the packet reordering timer length is selected based at least in part on a robust header compression (RoHC) decompressor state of the PDCP layer.

According to some embodiments, a longer length is selected for the packet reordering timer length when the RoHC decompressor state comprises a first order state than when the RoHC decompressor state comprises an initialization/refresh state; wherein a longer length is selected for the packet reordering timer length when the RoHC decompressor state comprises a second order state than when the RoHC decompressor state comprises the first order state.

According to some embodiments, the packet data comprises packet data received by the device wirelessly via a fifth generation new radio (5G NR) compressed data radio bearer.

According to some embodiments, the packet data further comprises packet data received by the device wirelessly via a long term evolution (LTE) compressed data radio bearer.

According to some embodiments, processing the packet data at the PDCP layer using the selected packet reordering timer length comprises: performing RoHC decompression of the packet data in-order according to sequence numbers for the packet data when there is no missing packet data according to the sequence numbers for the packet data; waiting for up to the length of the packet reordering timer for missing packet data according to the sequence numbers for the packet data when there is missing packet data according to the sequence numbers for the packet data; and performing RoHC decompression of the packet data with missing packet data according to the sequence numbers for the packet data skipped when there is missing packet data according to the sequence numbers for the packet data and the packet reordering timer has expired.

According to some embodiments, the method further comprises: receiving configuring information associated with adaptive scaling of the packet reordering timer length from a cellular base station.

According to some embodiments, the configuration information comprises an indication of one or more of: whether to enable adaptive packet reordering timer length selection; or one or more of the multiple possible packet reordering timer lengths.

According to some embodiments, the device comprises a wireless user equipment (UE) device.

According to some embodiments, the device comprises a cellular base station.

Still another exemplary embodiment may include a method, comprising: by a device: performing any or all parts of the preceding examples.

A further exemplary embodiment may include a device, comprising: an antenna; a radio coupled to the antenna; and a processing element operably coupled to the radio, wherein the device is configured to implement any or all parts of the preceding examples.

Another exemplary embodiment may include an apparatus, comprising a processor configured to implement any or all parts of the preceding examples.

Yet another exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

A yet further exemplary set of embodiments may include an apparatus comprising means for performing any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus, comprising:
a processor configured to cause a wireless device to:
receive packet data at a packet data convergence protocol (PDCP) layer;
adaptively select a packet reordering timer length to use for the packet data at the PDCP layer, wherein the packet reordering timer length is selected from multiple possible packet reordering timer lengths based on a robust header compression (RoHC) decompressor state;
perform RoHC decompression of the packet data in-order according to sequence numbers for the packet data when there is no missing packet data according to the sequence numbers for the packet data;
wait for up to the length of the packet reordering timer for missing packet data according to the sequence numbers for the packet data when there is missing packet data according to the sequence numbers for the packet data; and
perform RoHC decompression of the packet data with missing packet data according to the sequence numbers for the packet data skipped when there is missing packet data according to the sequence numbers for the packet data and the packet reordering timer has expired.

2. The apparatus of claim 1,
wherein a first packet reordering timer length is selected when a robust header compression (RoHC) decompressor of the PDCP layer is in an initialization/refresh state,
wherein a second packet reordering timer length is selected when the RoHC decompressor of the PDCP layer is in a first order state,
wherein a third packet reordering timer length is selected when the RoHC decompressor of the PDCP layer is in a second order state.

3. The apparatus of claim 2,
wherein the first packet reordering timer length is shorter than or equal to the second packet reordering timer length,
wherein the second packet reordering timer length is shorter than or equal to the third packet reordering timer length.

4. The apparatus of claim 1,
wherein the packet data comprises packet data received by the device wirelessly via a fifth generation new radio (5G NR) compressed data radio bearer, wherein the packet data further comprises packet data received by the device wirelessly via a long term evolution (LTE) compressed data radio bearer.

5. The apparatus of claim 1,
wherein the wireless device comprises a wireless user equipment (UE) device.

6. The apparatus of claim 5, wherein the processor is further configured to cause the wireless device to:
receive configuring information associated with adaptive scaling of the packet reordering timer length from a cellular base station.

7. The apparatus of claim 6, wherein the configuration information comprises an indication of one or more of:
whether to enable adaptive packet reordering timer length selection; or
one or more of the multiple possible packet reordering timer lengths.

8. The apparatus of claim 1,
wherein the wireless device comprises a cellular base station.

9. A method, comprising:
by a wireless device:
receiving packet data at a packet data convergence protocol (PDCP) layer;
adaptively selecting a packet reordering timer length to use for the packet data at the PDCP layer, wherein the packet reordering timer length is selected from multiple possible packet reordering timer lengths, wherein the packet reordering timer length is selected based at least in part on a robust header compression (RoHC) decompressor state of the PDCP layer;
performing RoHC decompression of the packet data in-order according to sequence numbers for the packet data when there is no missing packet data according to the sequence numbers for the packet data;
waiting for up to the length of the packet reordering timer for missing packet data according to the sequence numbers for the packet data when there is missing packet data according to the sequence numbers for the packet data; and
performing RoHC decompression of the packet data with missing packet data according to the sequence numbers for the packet data skipped when there is missing packet data according to the sequence numbers for the packet data and the packet reordering timer has expired.

10. The method of claim 9,
wherein a longer length is selected for the packet reordering timer length when the RoHC decompressor state comprises a first order state than when the RoHC decompressor state comprises an initialization/refresh state.

11. The method of claim 9,
wherein a longer length is selected for the packet reordering timer length when the RoHC decompressor state comprises a second order state than when the RoHC decompressor state comprises a first order state.

12. The method of claim 9,
wherein the packet data comprises packet data received by the device wirelessly via a fifth generation new radio (5G NR) compressed data radio bearer.

13. The method of claim 9,
wherein the packet data further comprises packet data received by the device wirelessly via a long term evolution (LTE) compressed data radio bearer.

14. A wireless device, comprising:
a plurality of antennas;
a radio operably coupled to the plurality of antennas; and
a processing element operably coupled to the radio;
wherein the wireless device is configured to:
receive first packet data at a packet data convergence protocol (PDCP) layer;
adaptively select a first packet reordering timer length to use for the first packet data at the PDCP layer, wherein the first packet reordering timer length is selected from multiple possible packet reordering timer lengths based at least in part on a robust header compression (RoHC) decompressor state of the PDCP layer;
perform RoHC decompression of the first packet data in-order according to sequence numbers for the first packet data when there is no missing packet data according to the sequence numbers for the first packet data;
determine when there is missing packet data according to the sequence numbers for the first packet data;
initiate the first packet reordering timer based at least in part on determining there is missing packet data according to the sequence numbers for the first packet data;
continue to perform RoHC decompression of the first packet data in-order according to sequence numbers for the first packet data if the missing packet data is received prior to expiry of the first packet reordering timer; and
perform RoHC decompression of the first packet data with the missing packet data skipped if the first packet reordering timer expires process the packet data at the PDCP layer using the selected packet reordering timer length.

15. The wireless device of claim 14,
receive second packet data at a packet data convergence protocol (PDCP) layer;
adaptively select a second packet reordering timer length to use for the second packet data at the PDCP layer, wherein the second packet reordering timer length is selected from multiple possible packet reordering timer lengths, wherein the second packet reordering timer length is different than the first packet reordering timer length; and
process the second packet data at the PDCP layer using the second packet reordering timer length.

16. The wireless device of claim 15,
wherein the first packet data is associated with a first data radio bearer, wherein the first data radio bearer is in a first RoHC decompressor state at the PDCP layer of the wireless device,
wherein the second packet data is associated with a second data radio bearer, wherein the second data radio bearer is in a second RoHC decompressor state at the PDCP layer of the wireless device, wherein the second RoHC decompressor state is different than the first RoHC decompressor state,
wherein different packet reordering timer lengths are selected for the first packet data and for the second packet data based at least in part on the second RoHC decompressor state being different than the first RoHC decompressor state.

17. The wireless device of claim 14, wherein the wireless device is further configured to:
receive configuration information indicating to enable adaptive packet reordering timer length selection,
wherein adaptively selecting the first packet reordering timer length from multiple possible packet reordering timer lengths is based at least in part on the configuration information indicating to enable adaptive packet reordering timer length selection.

18. The wireless device of claim 14, wherein the wireless device is further configured to:
receive configuration information indicating the multiple possible packet reordering timer lengths from which the first packet reordering timer length is selected.

19. The method of claim 9,
wherein a first packet reordering timer length is selected when a robust header compression (RoHC) decompressor of the PDCP layer is in an initialization/refresh state,
wherein a second packet reordering timer length is selected when the RoHC decompressor of the PDCP layer is in a first order state, wherein a third packet reordering timer length is selected when the RoHC decompressor of the PDCP layer is in a second order state.

20. The wireless device of claim 14, wherein a longer length is selected for the packet reordering timer length when the RoHC decompressor state comprises a first order state than when the RoHC decompressor state comprises an initialization/refresh state.

\* \* \* \* \*